Patented Jan. 31, 1939

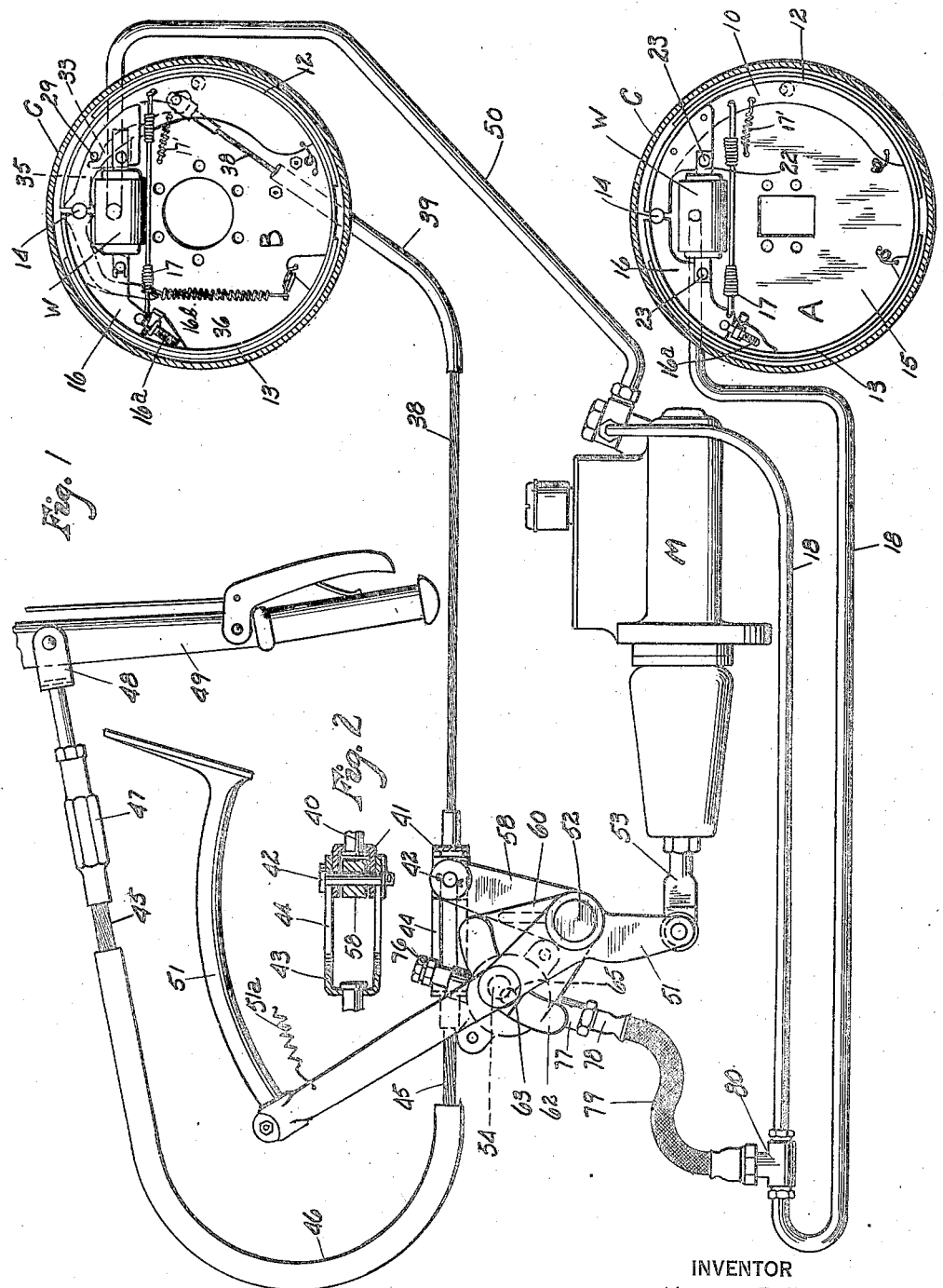

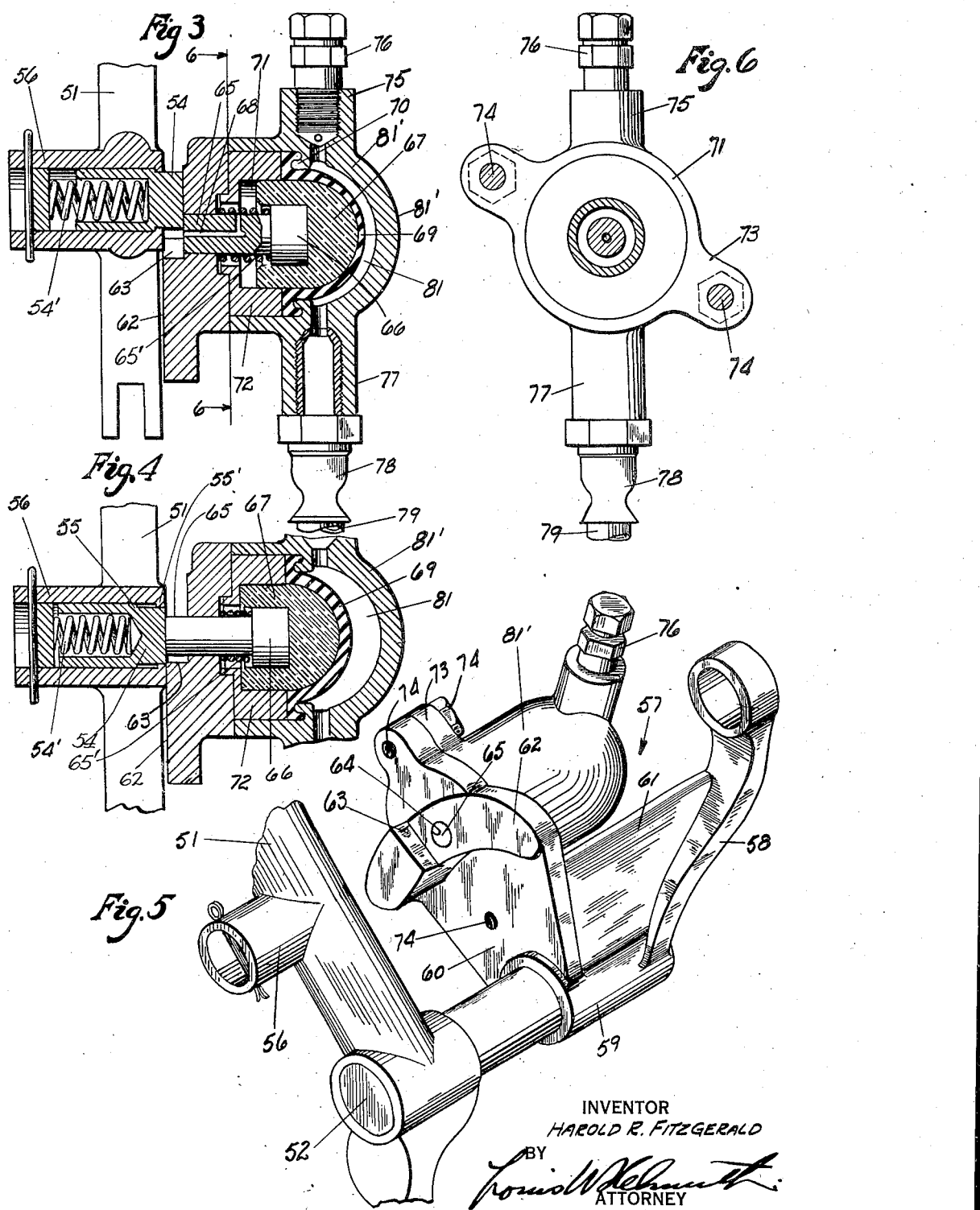

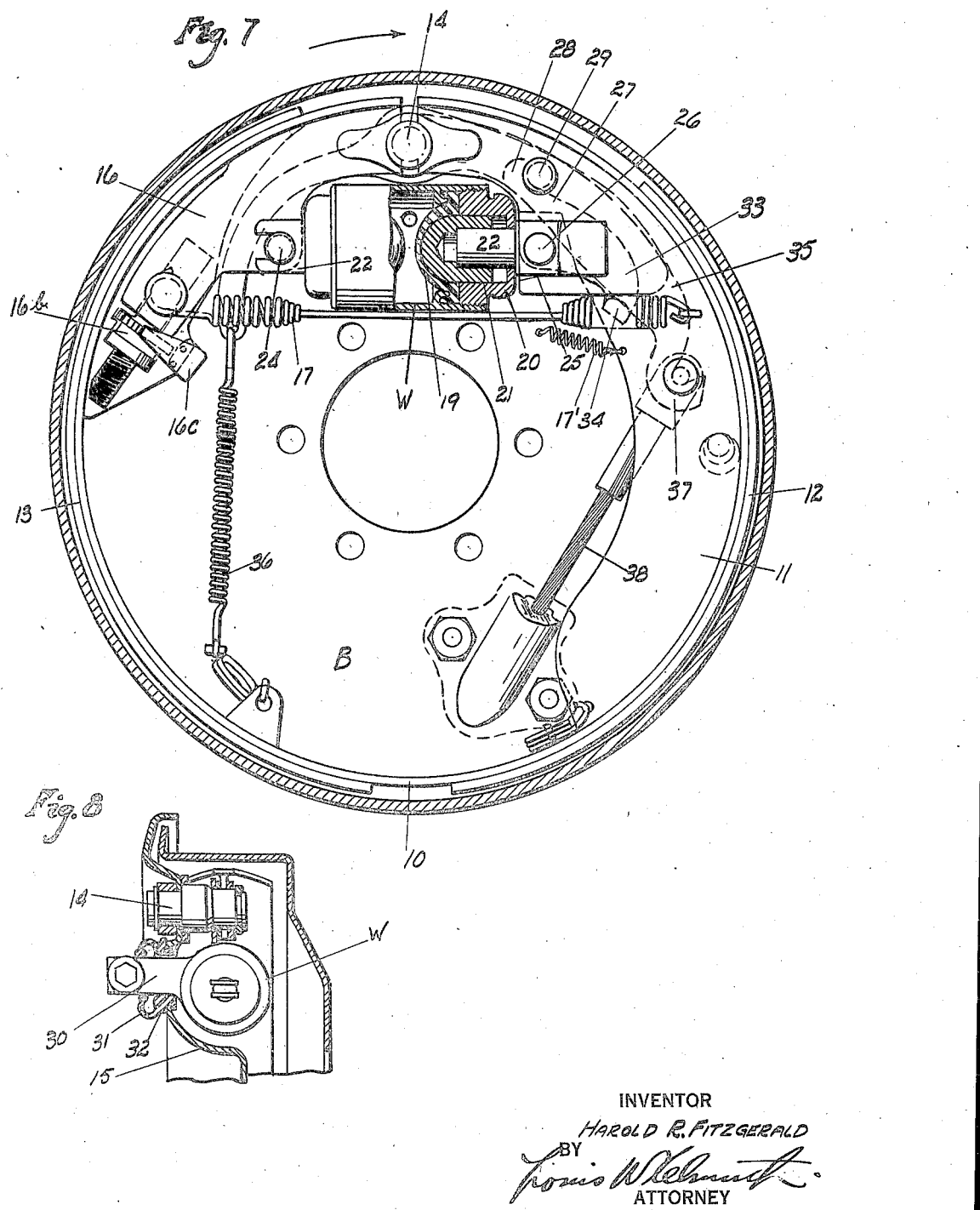

2,145,590

UNITED STATES PATENT OFFICE 2,145,590

AUTOMATIC EMERGENCY BRAKE PICK-UP FOR FLUID MEDIUM BRAKES

Harold R. Fitzgerald, Rocky River, Ohio, assignor to The Midland Steel Products Company, Cleveland, Ohio, a corporation of Ohio Application July 31, 1935, Serial No. 34,067

15 Claims. (Cl. 188—106)

This invention relates to new and useful improvements in devices and apparatus normally operated by a fluid medium and, which, upon failure of operation by the fluid medium, can be operated by a strictly mechanical instrumentality from the same operator operated part.

An important object of the invention is to provide apparatus of the foregoing character, which, during the successful operation of the device or apparatus with the fluid medium; the mechanical instrumentality for operating the same device or apparatus remains idle and non-creative of frictional drag.

Another important object of the invention is to provide a device of the foregoing description which includes a pressure responsive interlock normally connecting the mechanical instrumentality with the operator operated part and which is rendered inoperative as an interlock during successful operation of the device or apparatus by the fluid pressure means.

Another object of the invention is to provide in a device of the above character, a second operator operated part which is capable of operating the device or apparatus entirely independently of the mechanism which controls the activation of the fluid medium, thereby providing three sources for the actuation of the device or apparatus to be operated.

Another object of the invention is to provide a device of the foregoing characteristics which will provide a safety device for motor vehicles equipped with hydraulic brakes in case of failure thereof due to the usual causes and which can be easily installed in any vehicle, consists of few and simplified parts and is exceedingly efficient in operation.

Other objects and advantages of the invention will become apparent during the course of the following description.

In the accompanying drawings forming a part of the description and wherein like numerals are employed to designate like parts throughout the several views, Fig. 1 is more or less a diagrammatic illustration of the invention used for the operation of brake mechanisms on motor vehicles, Fig. 2 is a sectional view of the connection between the two operator operated parts and the mechanical instrumentality for operating the brakes, Fig. 3 is an enlarged section of the pressure responsive interlock between a foot pedal mechanism and the mechanical instrumentality for operating the brakes and illustrates the parts in position whereby the mechanical instrumentality is operated upon depression of the foot pedal in the event of failure of the hydraulic mechanism, Fig. 4 is a similar view illustrating the position of these parts when the interlock is disengaged during successful operation of the brakes by the fluid medium, Fig. 5 is an enlarged perspective view of the pressure responsive interlock mechanism showing the pedal mechanism moved laterally of its axis for a clearer illustration of the parts normally lying behind the same, Fig. 6 is a transverse section taken on the line 6—6 of Fig. 3, Fig. 7 is an enlarged elevation of the brake mechanism for a motor vehicle which is used on the two rear or driven wheels of the vehicle, Fig. 8 is a transverse section of the same illustrating the position of the friction device within a brake drum.

As illustrative of one practical embodiment of the invention, the same has been illustrated for the actuation of brakes of a motor vehicle, but it will be understood that many other uses of the invention are possible with the herein teaching of the invention.

In motor vehicles heretofore equipped with hydraulic brake systems, the usual foot brake pedal can only be used solely for the application of the brakes hydraulically and a separate so-called "parking brake" operated from an entirely separate lever, usually the emergency hand brake lever is provided for operating a mechanical transmission brake or the two rear wheel brakes for parking purposes or for emergency stops whenever the hydraulic actuation fails due to any of the usual causes. Therefore, when the hydraulic brakes fail to operate, the usual foot brake pedal is entirely useless and resort to the hand emergency brake lever must be had in an attempt to retard or stop the movement of the vehicle. With the recent changes in the location of these emergency hand brake levers necessitating sacrifice of leverage in mounting under the dash or cowl, the emergency brake hookups are inadequate to stop the present high speed cars prior to the occurrence of an accident usually occurring a split second from the time the driver realizes the impending danger until he learns of the failure of the hydraulic brakes and then reaches for the emergency hand brake inadequate to stop the vehicle before it has traveled too great a distance. By having the emergency brakes connected to the same foot brake pedal which operates the hydraulic system, the mechanical brakes are always in readiness for operation whenever any failure occurs in the hydraulic system, and the vehicle can be more rapidly brought to a stop.

The present invention proposes the normal connection of the mechanical operating mechanism for the two rear brakes of a vehicle with the same foot brake pedal for operating the hydraulic brake mechanism. Therefore, when the hydraulic system becomes inoperative for any of the usual causes between brake applications and idleness of the foot pedal, the pedal will not be moved down to the floor board when the driver finds it necessary to stop the vehicle in an emergency, since the foot pedal will already be connected with the mechanical operating means to apply the two rear brakes. However, should the hydraulic system fail during depression of the foot pedal after the mechanical operating means has been disconnected therefrom by the pressure responsive device and the foot pedal strikes the floor board, the driver simply releases pressure on the pedal so that it instantly returns to normal position to pick up the mechanical operating means to apply the two rear brakes as the pedal is again depressed. The hand emergency brake lever is thus truly a parking brake mechanism and is only used to prevent the vehicle from moving from a parked position.

Referring now more particularly to the drawings and to Fig. 1, the letter A indicates one of the two front wheel brakes, in which it will be noted that no mechanical actuator is associated therewith. The letter B designates one of a pair of rear brake mechanisms of a motor vehicle. The drum for each brake mechanism is designated by the letter C. The friction device or brake shoe which is adapted to be moved into engagement with the brake drum to retard or stop the rotation of the vehicle wheels is designated generally by the numeral 10 and in this particular embodiment is illustrated as a one-piece split flexible band as more fully disclosed in the patent granted to Sneed No. 1,789,392. Reference to Fig. 7 will show to better advantage the reinforcing radial flange 11 of the T-section band associated with the right hand side of the band to render this side 12 more rigid than the other half or side of the band 13 which is the end first moved into engagement with the drum when the vehicle to which the brake mechanism is applied, moves in a forward direction. An anchor pin 14 fixed to the brake apron 15 between the split ends of the band is adapted to form a stop against which one end of the band anchors, when the drum rotates in either direction. The end of the flexible half 13 of the band is provided with a screw adjuster mechanism 16 for varying the effective length of the shoe and compensating for lining wear as clearly set forth in the aforesaid Sneed patent. As explained in this prior patent the adjusting mechanism includes a bifurcated screw 16a having a nut 16b held against longitudinal movement with respect to the adjuster. This nut is provided with a serrated annular portion which is disposed opposite an opening in the apron so that it may be turned from the exterior of the brake drum. In order to prevent accidental rotation of this nut and to make an audible clicking sound each time a tooth of the serrated nut passes a pre-determined point, a spring detent 16c is fastened to the adjuster and has its free end serving as a spring pawl in the serrations of the nut. A retractor spring 17 extends as a cord across the brake mechanism and has its opposite ends connected to the two ends of the brake band for normally urging the split ends of the band toward the anchor pin 14. In order to insure that the flexible side of the band moves away from the anchor with less resistance than its rigid side, a second retractor spring 17' is connected to the web 11 and the apron as illustrated.

Each front brake mechanism A is operated by means of a wheel cylinder receiving a fluid pressure medium through a pipe line 18.

The same kind of wheel cylinder is provided for each brake mechanism on each of the two rear wheels, and as best shown in Fig. 7, a pair of rubber diaphragms 19 have their margins clamped in liquid tight relationship to the wheel cylinder by being forced against integral shoulders of the wheel cylinders by means of end caps 20 20 screw threaded into the threaded ends of the cylinder as shown, all as specifically described in the co-pending application of Russell S. Begg et al., Serial No. 680,722, filed July 17, 1933. A hemispherical piston head 21 backs up each rubber diaphragm. These pistons may be made of any of the close grained metals as lubricant impregnated brass and bronze but excellent results have been obtained from the use of composition material such as phenolic condensation products, like "Bakelite", with or without graphite or other lubricant included in the composition or spread upon the surface which contacts the cup or diaphragm. The piston stems 22 of the pistons extend through the end caps 20, and in the case of the front wheel brake mechanisms, the ends of the two pistons are bifurcated to straddle the adjuster 16 and the reinforcing plates on the rigid end of the band so that pins 23 extending through these bifurcated ends and plates support the wheel cylinders upon the separable ends of the band. The retractor springs normally hold the pistons firmly against the cups and may slightly stretch the same as explained in the above pending application. When a fluid medium, such as hydraulic liquid is placed under pressure in the wheel cylinder, the two pistons are caused to separate and exert thrust on both ends of the brake band to move them toward the drum whereby one end or the other of the band will be picked up by the drum rotation and cause the band to wrap itself into engagement with the drum thereby retarding or stopping its rotation.

In the case of the two rear wheel brake mechanisms, the piston 22 of the wheel cylinder adjacent the more flexible end of the band is bifurcated to straddle the adjuster 16 and its free end is forked in a plane at right angles to the first bifurcation to straddle a pin 24 extending transversely through the adjuster. The other piston stem 22 of each rear brake wheel cylinder has a slightly longer end than the other piston and is bifurcated back from its free end to straddle the reinforcing plates secured to opposite sides of the radial flange of the rigid end of the shoe. Each of these plates is slotted as at 25 thereby permitting passage of a transverse pin 26 for pivotally connecting the intermediate portion of a lever 27 to the piston stem. One end 28 of this lever is adapted to bear against a pin 29 carried by the brake band so that, as the other end of the lever is swung, the fulcrum pin 26 and piston stem 22 are moved to the left of Figure 7 until the shoulder of the piston stem engages the end cap 20 and thereby moves the wheel cylinder bodily to the left of Figure 7 and due to the abutment of the other piston stem 22 with its end cap, the flexible end of the band is moved away from the anchor pin. At the same time, the end 28 of the lever 27 is swung toward the right of Figure 7 to bear against the pin 29 and thereby move the rigid end of the band toward the drum. Depending upon the direction of rotation of the drum, determines which end of the band goes out first against the drum and which end of the band is moved back against the anchor pin due to the servo action of the band. As shown in Fig. 8, the wheel cylinder W is provided with a rearwardly extending neck 30 by which the cylinder is connected to the conduit leading the medium thereto. This neck 30 is passed through a rubber grommet 31 fastened in an aperture in the brake apron 15 and it will be noted that the lower side of the grommet is enlarged and thickened as at 32 so as to form a partial support for the wheel cylinder on the apron of the drum while permitting the wheel cylinder to shift during operation of the brake mechanism manually through the mechanical instrumentality.

The end 33 of lever 27 is provided with a lateral projection 34 which engages the underside of one end of a long arcuate lever 35 having its intermediate portion pivotally mounted on the anchor pin 14. This lever 35 is returned to a brake release position by means of a tension spring 36 connected to the apron as illustrated. The other actuating end of lever 35 is provided with a hooked portion adapted to be straddled by a yoke and pin 37 fastened to one end of a flexible wire cable 38 which extends through the backing plate or apron at an angle as shown and then through the usual conduit 39 toward the operator operated part for operating the same. As a pull is exerted on the cable 38, the right hand end of lever 35 is fulcrumed downwardly so as to move lever 27 on its fulcrum 26 by reason of the abutment and sliding contact 34 more fully described in a co-pending application of Kuiper et al., Serial No. 654,192 filed January 30, 1933.

The cable 38 extends to be swivelly connected as at 40 with a U-shaped stamping 41 having a pin 42 extending transversely through its two arms. This bracket 41 is longitudinally aligned with a second U-shaped bracket or yoke 43 having a pair of arms provided with elongated slots 44 therein for the longitudinal movement of the pin 42 therein under certain circumstances as will be hereinafter described. The yoke 43 is swivelly connected to another length of cable 45 which extends through a suitable conduit 46 and is connected by an adjustable end fitting 47 and U-shaped clip 48 to a hand operated emergency brake lever 49, which in recent cars is pivotally connected at its upper end under the cowl or dash and is provided with a ratchet mechanism for retaining it in any desired braking position to prevent the car from rolling when parked.

In order to create pressure in the wheel cylinders of the respective brake mechanisms, the hydraulic master cylinder or pressure creating device M, of the well known construction, is provided with a conduit 50 leading to the two rear wheel brakes, while the conduit 18 leads to the two front wheel brakes. In the present embodiment of the invention, the thrust bearing foot pedal 51 is fulcrumed on a shaft 52 and its lower end is connected to a piston rod 53 which is connected to the usual piston in the master cylinder so that upon forward movement of this piston, the liquid in the master cylinder and lines is placed under pressure to activate the wheel cylinders on all four brakes and simultaneously apply the brake bands to the four drums. This is the usual operation of hydraulic brakes from the customary foot operated brake pedal 51. As is usual in master cylinders, a spring is positioned therein to urge the piston and stem or link 53 to the left of Fig. 1 which of course returns the foot pedal 51 to brake release position, and this return movement can be augmented by a return spring 51a connected to the pedal at a fixed point so that the piston stem 53 may be returned to normal position independently of the piston within the master cylinder.

When the present hydraulic brakes fail for any of the usual reasons, such as loss of liquid from the line, operation of the foot pedal 51 will cause absolutely no braking effect at the wheels and this foot pedal will move all the way to the floor board leaving the driver practically helpless in case of an emergency stop. His only salvation is the operation of the emergency hand brake lever 49, which due to the small mechanical advantage in its present mountings is inadequate to pull on the brake cables 38 for the two rear wheel brakes to cause a rapid retardation of the vehicle. It is therefore the purpose of this invention to provide for the actuation of the two rear wheels through mechanical instrumentalities by operation of the same foot brake pedal 51 which operates on the hydraulic system. However during successful operation of the hydraulic brake system, there is no need for pulling on the mechanical instrumentalities to operate the two rear brakes mechanically, and it is for this reason that provision has been made so that the foot pedal only operates the two rear brakes mechanically when there is a failure of the hydraulic braking system. To accomplish this, the foot pedal adjacent its fulcrum, as is best seen in Figs. 3 to 5 inclusive, is provided with a spring pressed plunger 54 having a shoulder 55 to abut an annular shoulder 55' of the pedal to limit its normal outwardly projected position as shown in Fig. 3. This plunger 54 and the spring 54' therefor are housed in a lateral tubular extension 56 shown in Fig. 5. Of course, it will be appreciated that this latch or detent 54 need not be applied directly to the pedal, but can be used on any lever in any layout which is actuated by said foot pedal.

A combined lever and pressure responsive device indicated generally by the numeral 57 is loosely and freely mounted upon the pedal shaft 52 in close proximity to the pedal 51. This pressure responsive device is formed with a lever arm 58 integral with a bearing portion 59, and the free end of this lever is perforated to receive the pin 42 and to be straddled by the arms 41 of the clip attached to the cable 38 so that when the lever 58 is moved in a counter-clockwise direction, it pulls on the cable 38 to actuate the two rear brakes with the mechanical instrumentalities and since the pin 42 moves idly in slots 44, the emergency hand brake lever is unaffected. The bearing 59 at its opposite end is provided with a radially extending sector-shaped arm 60 which is integrally connected to the arm 58 by an integral web formation 61. The base of the arm 60 is provided with a raised, stepped plateau portion 62, the step therein defining a shoulder 63 arranged normally in the path of plunger 54 so that actuation of the pedal 51 moves the end of the plunger 54 into engagement with the shoulder 63 and thereby moves the pressure responsive device and lever 58 in the same direction to pull on the cable 38 in the event the fluid braking system is inoperative. The arcuate raised portion 62 is defined by arcs struck from the center of the pedal shaft 52. In the portion 62 at the base of the shoulder 63, is an opening 64 extending transversely through the arm 60 to slidably receive a piston stem 65 having its inner end provided with an enlarged portion 66 to fit within a cavity of a hemispherical head 67 similar to those used in the wheel cylinders. The piston stem is provided with a venting passage 68 extending longitudinally therethrough to its free end and laterally into a chamber in back of the piston to vent the same of air. A similar passage may be provided in the plunger 54 if necessary. A coiled spring 65' weaker than spring 54' surrounds the stem 65 with one end engaging the enlarged head 66 and the other end engaging the bottom of a recess in the arm 60 in order that the outer end of the stem 65 will be normally held flush with or below the surface normally engaged by the plunger 54, whereby this plunger will not get out of its co-operative position with respect to the stem 65 when the hand brake lever 49 is operated. It will be noted, in the normal brake release position of the piston stem 65 and plunger 54, shown in Fig. 3 that they are arranged in eccentrically abutting relationship end to end and that the plunger 54 is of greater diameter than the pin 65 so that there will be an interval of time during pedal movement before the plunger is moved entirely across the piston stem 65. This provides ample opportunity for the piston stem to push the plunger 54 clear of the shoulder 63 to temporarily disconnect the mechanical instrumentality from the foot pedal.

As in the wheel cylinder construction, the hemispherical piston head 67 engages the inner side of a hemispherical cup-shaped diaphragm 69. The margins of this diaphragm 69 are securely clamped between an integral annular inwardly and axially extending extension 70 of a pressure chamber 81 formed in a casing 81' and an annular member 72 held within an annular lateral extension of the hemispherical casing. This casing is provided with diametrically extending lateral fastening lugs through which screws 74 pass and then into the arm 60 for clamping the annular member 72 between the arm 60 and the lateral flange of the diaphragm 69. This annular member 72 is provided with a concentric flange fitting within a corresponding cavity in the back of the arm 60. If desired, the member 72 may be externally threaded and the housing 81' internally threaded so that the member 72 may be screwed into the housing to clamp the rim of the diaphragm against the integral projection 70. In some installations the spring of plunger 54 can be made sufficiently strong to not only project the plunger but also to move the piston stem 65 and piston head 67 to the right of Fig. 3, to eliminate the use of spring 65'.

The upper portion of the pressure chamber 71 is provided with an opening extending into an interiorly threaded boss 75 which receives the usual bleeding screw 76 and lock nut in the hydraulic brake system so that the fluid pressure chamber may be freed of all air bubbles. At a diametrically opposite point on the pressure chamber, an internally threaded nipple 77 is formed integral to receive the threaded end fitting 78 of a length of flexible hose 79 which taps into one of the conduits 18 or 50 of the hydraulic brake system at a point indicated at 80. The interior of nipple 77 of course communicates with a chamber 81 formed between the diaphragm 69 and the outer convex wall of the pressure chamber so as to admit fluid under pressure for moving the diaphragm and piston 67 to the left of Figs. 3 and 4 each time the foot pedal is operated and when the hydraulic brake system is functioning.

The operation of the device is as follows: Assuming that the hydraulic brake system is in perfect working order, depression of the foot pedal 51 moves a piston in the master cylinder and creates fluid pressure in the conduits 18 and 50 and wheel cylinders instantaneously with the first movements of the foot pedal. This creation of pressure in the hydraulic lines will create corresponding pressure through the hose connection 79 and in the pressure responsive housing 81' to move the piston 67 to the left of Figs. 3 and 4, thereby forcing the plunger 54 back against the tension of its spring to elevate it over the shoulder 63 and permit the operation of the hydraulic braking mechanism without dragging with it the mechanical instrumentality which is the cable 38 and mechanical actuating parts within the two rear brakes. If during the depression of the pedal, the hydraulic system becomes inoperative, the foot pedal will be moved to the floor boards apprising the driver of the failure so that he will permit the foot pedal to return to normal position as shown in Fig. 3. Then the plunger 54 will automatically move behind the abutment or shoulder 63 under the influence of its spring so that when the operator forces the foot pedal down again, the plunger 54 picks up the mechanical instrumentality for operating the two rear brakes mechanically. Should a leak occur in the hydraulic system prior to the actuation of the foot pedal, the mechanical linkage will be immediately operative due to the fact that the spring pressed plunger 54 is normally disposed behind the shoulder 63, and therefore in its brake applying movement, will swing the entire pressure responsive device 57 in a counter clockwise direction on the pedal shaft 52 and move the lever arm 58 in a corresponding direction. The upper end of lever 58 being connected directly to the cable 38, pulls the same to the left of Fig. 1 thereby swinging the long lever 35 on the anchor pin 14, which movement in turn actuates the lever 33 to move both ends of the band outwardly as hereinbefore explained.

From the foregoing description, it is believed that the construction and operation of the device is entirely clear.

It is of course understood that various changes in the size, shape and arrangement of parts may be resorted to without departing from the spirit of the invention or the scope of the appended claims.

I claim:

1. A brake mechanism comprising in combination a foot pedal mechanism and a friction device, a fluid pressure mechanism operated by the pedal mechanism and connected to a chamber for operating the friction device, mechanical operating mechanism connecting the pedal mechanism and the friction device and including a lever carrying a spring projected plunger, a member formed with a shoulder and adapted to be moved by said plunger to operate the mechanical operating mechanism, and pressure responsive mechanism adapted to move said plunger away from said shoulder during operation of the friction device by said fluid pressure mechanism thereby permitting the mechanical operating mechanism to remain idle.

2. A brake mechanism comprising in combination a foot pedal mechanism and a friction device, a fluid pressure mechanism operated by the pedal mechanism and connected to a chamber for operating the friction device, mechanical operating mechanism connecting the pedal mechanism and the friction device and including a lever carrying a spring projected element, a member having a shoulder and adapted to be moved by said element engaging said shoulder to operate the mechanical operating mechanism, said member including a pressure responsive device normally engaging said element when the pedal mechanism is in a brake release position and adapted to move said element clear of said shoulder upon pressure being created in said fluid pressure mechanism by actuation of the pedal mechanism.

3. A brake mechanism comprising in combination a foot pedal mechanism and a friction device, a fluid pressure mechanism operated by the pedal mechanism and connected to a chamber for operating the friction device, mechanical operating mechanism connecting the pedal mechanism and the friction device and including a lever carrying a spring projected element, a member having a shoulder and adapted to be moved by said element engaging said shoulder to operate the mechanical operating mechanism, said member including a pressure responsive device normally engaging said element eccentrically when the pedal mechanism is in a brake release position and adapted to cause movement of said element upon pressure being created in said fluid pressure mechanism by actuation of the pedal mechanism.

4. A brake mechanism comprising in combination a foot pedal mechanism and a friction device, a fluid pressure mechanism operated by the pedal mechanism and connected to a chamber for operating the friction device, mechanical operating mechanism connecting the same pedal mechanism and the same friction device and including concentrically mounted levers one of which is included in said mechanical operating mechanism and is normally in the path of the other lever whereby failure of the fluid pressure means permits one lever to move the other to operate the mechanical operating mechanism.

5. A brake mechanism comprising in combination, a foot pedal mechanism and a friction device, a fluid pressure mechanism operated by the pedal mechanism and connected to a chamber for operating the friction device, said foot pedal mechanism including a lever, mechanical operating mechanism connecting the pedal mechanism and the same friction device for operating the latter from the same pedal mechanism, said mechanical mechanism including a lever arm having its axis concentric with the first mentioned lever, and inter-locking means normally connecting said two levers and rendered inoperative as an inter-lock during operation of the friction device by said fluid pressure mechanism, thereby permitting the mechanical operating mechanism to remain idle.

6. A brake mechanism comprising in combination, foot and hand operated levers, a friction device, mechanical linkage connecting the device with the hand operated lever, fluid medium means for operating the friction device connected with the foot operated lever, means normally connected with the foot operated lever and having a lost motion connection with said mechanical linkage whereby operation of either of the hand or foot operated levers does not move the other, and fluid responsive means operated by said fluid medium means for disconnecting the mechanical linkage from said foot operated lever.

7. A brake mechanism comprising in combination a pedal having a spring pressed pin, a friction device, fluid medium means connected with said pedal for operating said device, a lever normally engaged by said pin for operating the friction device mechanically upon failure of the fluid medium means upon depression of said pedal, and a self contained fluid pressure responsive means carried by said lever and operated by the fluid medium means to move the pedal pin out of engagement with the lever.

8. A brake mechanism comprising in combination a pedal having a spring pressed pin, a friction device, fluid medium means connected with said pedal for operating said device, a lever normally engaged by said pin for operating the friction device mechanically upon failure of the fluid medium means upon depression of said pedal, and a pressure chamber carried by said lever and connected to said fluid medium means, a diaphragm in said chamber subject to pressure changes therein, a piston backing up said diaphragm, and said piston having a stem adapted to move the pedal pin out of engagement with said lever upon operation of the fluid medium means.

9. In a brake mechanism, a brake drum, a friction brake device therein, a foot pedal, a fluid pressure mechanism operated by the pedal and connected to a chamber within said drum, for operating said brake device, mechanical operating mechanism connecting the pedal with said same brake device for also operating the latter, said mechanical operating mechanism including a stop 63, movable with the mechanical operating mechanism, a member 65 adapted to be moved by the pedal into engagement with the stop and then to move said stop along with the mechanical operating mechanism to operate the single brake device by means of said mechanical operating mechanism, and said member being held disengaged from said stop when braking pressure is developed in said fluid pressure mechanism to prevent the mechanical operating mechanism from being moved by the pedal whenever said braking pressure is created in the fluid pressure mechanism.

10. A brake mechanism comprising in combination, a pedal mechanism and a friction device, a fluid pressure mechanism operated by the pedal mechanism for operating said friction device, mechanical operating mechanism for operating the same friction device and including a lever mechanism connected at all times with said mechanical operating mechanism, said lever mechanism having a shoulder and a pressure operated member adjacent the base of the shoulder and movable by said fluid operated mechanism for the depth of said shoulder, and a movable element carried by the pedal mechanism and engaging said member in the path of said shoulder to be moved by said pressure operated member over said shoulder upon pressure being created in said fluid pressure mechanism by actuation of said pedal mechanism.

11. A brake mechanism comprising in combination, a pedal mechanism including a pedal, a friction device, a fluid pressure mechanism operated by the pedal for operating said friction device, mechanical operating mechanism for operating the same friction device and including a lever mechanism connected at all times with said mechanical operating mechanism and mounted concentric with said pedal, said lever mechanism having a shoulder and a pressure operated member adjacent the base of the shoulder and movable by said fluid operated mechanism for the depth of said shoulder, and a movable element carried by the pedal and engaging said member in the path of said shoulder to be moved by said pressure operated member over said shoulder upon pressure being created in said fluid pressure mechanism by actuation of said pedal mechanism.

12. A brake mechanism comprising in combination, foot and hand operating levers, a friction device, mechanical linkage connecting the friction device with the hand lever and including a slotted yoke, fluid medium means for operating the same friction device connected to the foot lever, a second lever connected at all times with said mechanical linkage and operating in the slot of said yoke with lost motion with respect to the yoke, said second lever having a shoulder and a fluid responsive means operated by said fluid medium means, and said foot lever having a member normally in the path of said shoulder and moved by said fluid responsive means out of the path of said shoulder upon pressure being created in said fluid pressure mechanism.

13. A braking system comprising fluid pressure producing means, fluid pressure actuated means connected thereto, braking elements actuated thereby, mechanical means for actuating the braking elements, independent operating means for the pressure producing means and mechanical means, and means dependent upon the fluid pressure of said fluid pressure producing means and effective for instantaneously coupling the mechanical means to the operating means of the pressure producing means upon failure of the pressure producing means.

14. A braking system comprising fluid pressure producing means, braking elements actuated thereby, mechanical means for actuating the braking elements, an actuator for the pressure producing means, an actuator for the mechanical means, and means dependent upon the fluid pressure of said fluid pressure producing means for instantaneously coupling the mechanical means with the actuator for the pressure producing means upon failure of the pressure producing means.

15. A vehicle braking system comprising a set of brakes, a brake operating gear having a hand-actuated lever, a brake operating gear having a foot-actuated lever, said two brake operating gears being normally independently operable, and means for causing the foot-actuated lever when operated to operate the hand-actuated operating gear to make an application of the brakes upon failure of the brake operating gear having the foot-actuated lever.

HAROLD R. FITZGERALD.